Sept. 3, 1957 T. DAVIS 2,805,032
SUPERSONIC FLIGHT CONTROL DEVICE
Filed Oct. 24, 1951 2 Sheets-Sheet 1
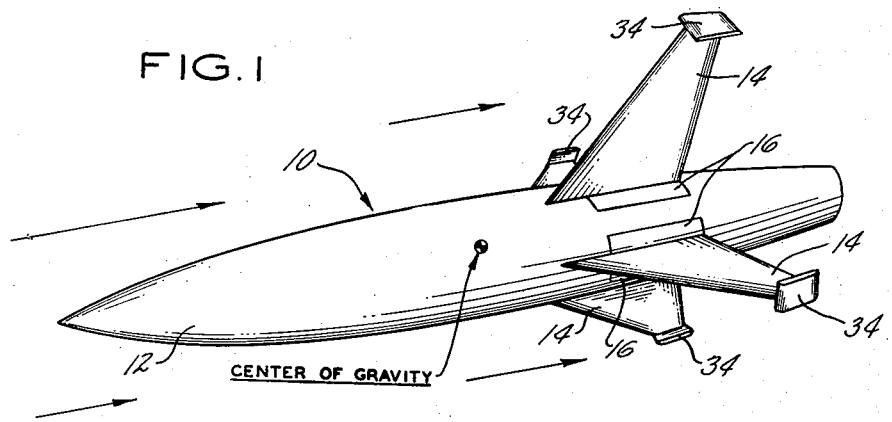
FIG. 1
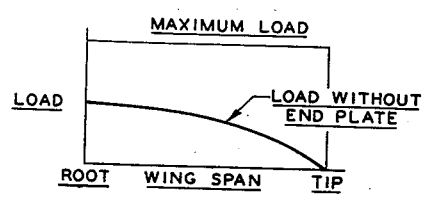
FIG. 4
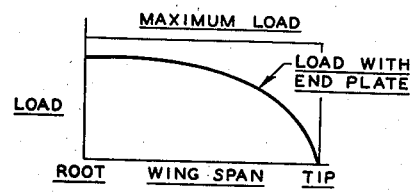
FIG. 5
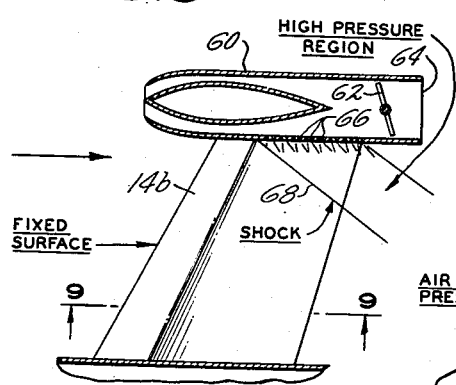
FIG. 8
FIG. 9
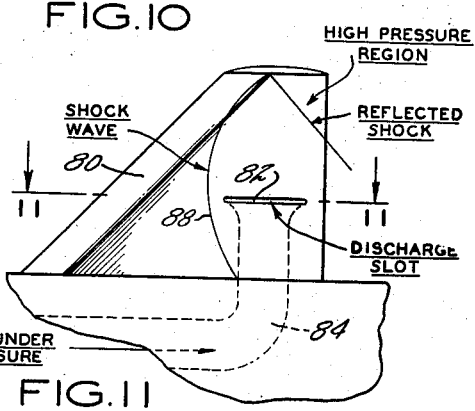
FIG. 10
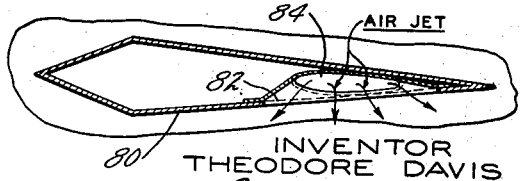
FIG. 11
INVENTOR
THEODORE DAVIS
BY Leonard F. Wehrli
ATTORNEY Sept. 3, 1957

T. DAVIS 2,805,032

SUPERSONIC FLIGHT CONTROL DEVICE

Filed Oct. 24, 1951

INVENTOR
THEODORE DAVIS
BY Leonard F Weklind
ATTORNEY

United States Patent Office 2,805,032
Patented Sept. 3, 1957

2,805,032
SUPERSONIC FLIGHT CONTROL DEVICE

Theodore Davis, Manchester, Conn., assignor, by mesne assignments, to Chance Vought Aircraft, Incorporated, a corporation of Delaware Application October 24, 1951, Serial No. 252,822

1 Claim. (Cl. 244—75)

This invention relates to control devices for aircraft and more particularly to improved control systems for supersonic aircraft.

In copending patent application Serial No. 89,306, filed April 23, 1949, by John G. Lee et al. there was disclosed a control system which utilized induced shocks to create differences in pressure across fixed surfaces in order to control a supersonic vehicle. This invention utilizes somewhat the same basic principle to provide control of a supersonic aircraft.

It is therefore an object of this invention to provide a supersonic flight control device having improved characteristics and which provides increased controlling forces and greater controlling moments.

These and other features of the invention will become readily apparent from the following detailed description of the drawings in which:

Fig. 1 is a perspective view of a supersonic vehicle or missile having features of this invention.

Figs. 4 and 5 are graphical representations comparing the controlling forces that are produced by the invention.

Figs. 8 and 9 show a still further modification.

Figs. 10 and 11 illustrate a modification of the Figs. 2 and 3 construction.

For a detailed explanation of how a shock type control system differs from the ordinary subsonic controls, reference can be had to the above-referred to application.

Referring to Fig. 1, a supersonic vehicle is generally indicated at 10 as having a fuselage 12 and a plurality of fixed control surfaces 14 extending therefrom. In order to provide control for the vehicle at supersonic speeds a plurality of extensible members 16 are provided in the fuselage adjacent each of the fixed surfaces 14. These extensible members 16 may be pivoted at their upstream end so that their downstream ends may be extended into the airstream by suitable mechanism.

Figure 2:
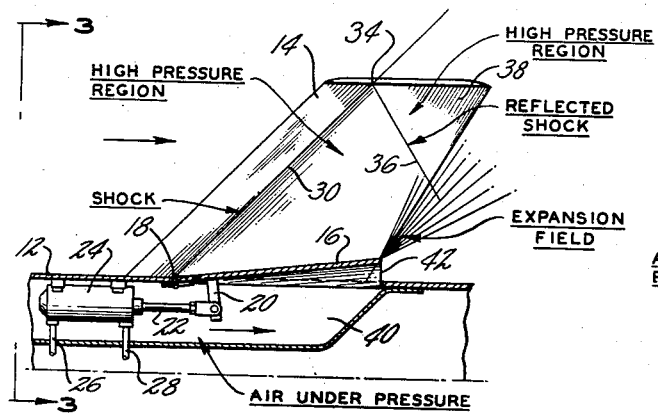
Fig. 2 is a partial view of a vehicle similar to that illustrated in Fig. 1 illustrating the shock producing mechanism for creating differences in pressure over one of the fixed controlling surfaces.

A simple showing of how this can be accomplished is illustrated in Fig. 2. As shown herein, each of the flaps 16 may be located in the wall of the fuselage 12 and pivoted, as for example at 18, so that the trailing edge thereof may be moved outwardly into the main stream. An arm 20 is operatively connected to an actuated rod 22 of an actuating cylinder 24 which is moved by fluid under pressure admitted to either of lines 26 or 28.

At supersonic speeds movement of the flap 16 into the main airstream will create a shock 30 which extends from the fuselage 12 adjacent the leading edge of the flap 16 and then across the span of the fixed surface 14. Immediately behind the shock 30 there is created a high pressure region which, therefore, produces a controlling force on the fixed surface 14 tending to move it toward the side of relatively low pressure. Hence, by selectively moving the flaps 16 in various combinations, roll, yaw and pitch control of the vehicle can be obtained. The mechanism described thus far is disclosed in the above-mentioned patent application.

This invention, however, resides in the means for improving the control forces that can be exerted on fixed control surfaces. Thus, as illustrated in Figs. 1 and 2, each of the fixed surfaces 14 include end plates 34 which provide surfaces which lie in a plane transversely of the plane of the fixed surface 14. Hence, when the shock 30 is created (as the flap 16 is extended) rather than having the shock pass beyond the extremities of the fixed surface 14 it is reflected to form a reflected shock 36 thus creating a second high pressure region 38 adjacent the outboard end of the fixed surface 14. It is then apparent that creating the second high pressure region at such a distance out along the span of the fixed surface 14 gives a large controlling moment relative to the axis of the fuselage.

In order to reduce the drag created by the flap 16 it may be desirable to force air under pressure into the passage 40 so that as the flap 16 is extended it will create an opening 42 so that a jet of air is discharged therethrough. By ejecting a jet in this manner the expansion field adjacent the trailing edge of the flap 16 is considerably weakened thereby reducing the drag.

The comparative controlling load which can be produced by reflecting the controlling shock wave is best illustrated in Figs. 4 and 5. It is believed that these figures are self-explanatory.

Figure 6:
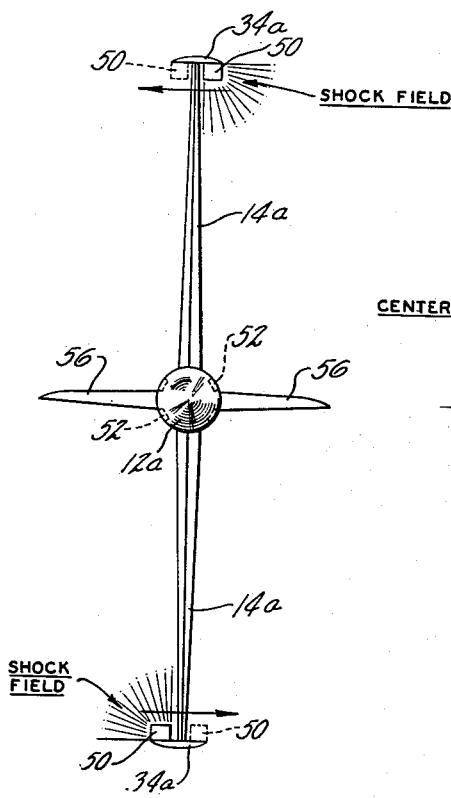
Figs. 6 and 7 illustrate a modified type of control system.
Figure 7:
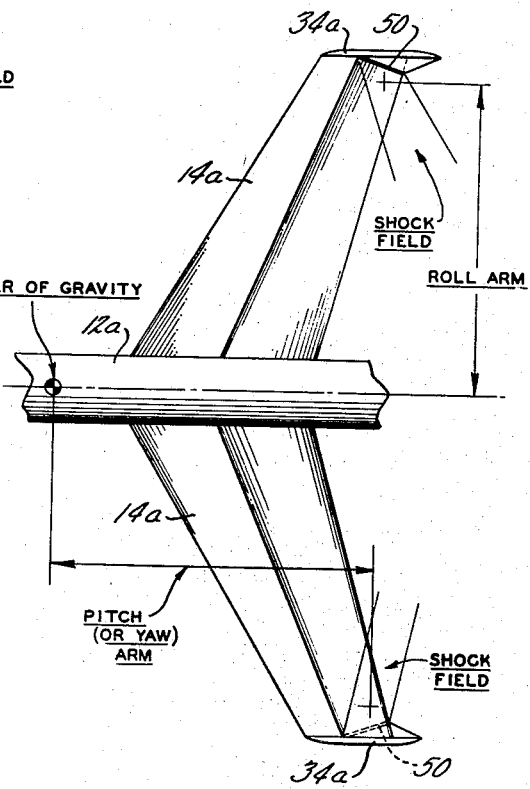

Figs. 6 and 7 illustrate another modification of this invention wherein control may be obtained by carrying extensible flaps 50 in the end plates 34a of the fixed control surface 14a. Hence roll control and pitch control may be obtained by selectively extending the flaps 50. Yaw control of such a vehicle can be obtained by utilizing the drag of both the flaps 50 on any one wing tip. However, it may be preferred rather than creating such large drag to provide a number of flaps 52 adjacent transverse fixed control surfaces 56 by extending the flaps 52 on one side of the fixed surface 56, motion in one direction will be provided. Extending the flaps 52 on the other side of the fixed surface 56 will provide motion in another direction. It will be noted particularly in Fig. 7 that where the fixed surfaces 14a are swept back a large pitch or yaw moment arm is provided while the relative center of the control force in the shock field is at a considerable distance from the axis of the fuselage 12a thus providing a large roll moment arm.

Figs. 8 and 9 illustrate another form of this invention which comprises a ram compressor or supersonic diffuser 60 carried at the tip of the fixed control surface 14b. A valve 62 is provided so as to permit the compressed air to be exhausted at the opening 64 or forced through the apertures 66 whereby a shock 68 and a high pressure region is created adjacent the tip of the fixed surface 14b.

Fig. 9 illustrates the type of supersonic airfoil that is used for the fixed control surfaces and is illustrated herein to show that the maximum thickness occurs at a rather definite line as compared to subsonic airfoils. In each of these instances where shocks are used to control it is desirable to have the shock created coincident with or aft of this maximum thickness to avoid high drag. In other words, minimum drag is obtained as a result of the shocks if the shock does not occur upstream of the maximum cord thickness.

Figure 3:
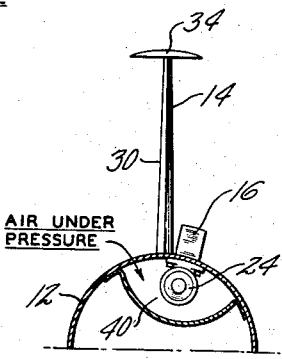
Fig. 3 is a partial cross-sectional view taken along the line 3—3 of Fig. 2.

Figs. 10 and 11 illustrate a modification of the construction shown in Figs. 2 and 3. Herein the wing or surface 80 has a slot 82 therein which is connected to a duct 84. Air under pressure may be directed through the duct 84 and the slot 82 to create a jet which is emitted substantially perpendicular to the wing surface. The air jet causes a shock wave or low wave 88 which is reflected by the end plate to produce a further high pressure region adjacent the tip of the wing 80. It is to be understood that slots such as 82 may be provided on the upper and lower major surfaces of the wings 80 and control valves or similar devices would selectively control the flow of air through the slots.

As a result of this invention it is apparent that an improved supersonic flight control device has been created which is highly efficient and produces large controlling forces with a minimum of drag.

Although certain embodiments of this invention have been illustrated and described it will be apparent that various changes and modifications may be made in the construction and arrangement of the various parts without departing from the scope of this novel concept.

What it is desired to obtain by Letters Patent is:

In a method for controlling an aircraft adapted to operate through air of relative supersonic velocity, the aircraft including at least one fixed wing terminating in a tip, the steps comprising, modifying the flow over at least one major surface of the wing by creating a shock which substantially runs along the span of the wing and varies the pressure thereover, and reflecting said shock adjacent said tip back across said surface adjacent said tip.

References Cited in the file of this patent

UNITED STATES PATENTS

| | | |
|---|---|---|
| 1,879,187 | Goddard | Sept. 27, 1932 |
| 2,400,388 | Campbell | May 14, 1946 |
| 2,504,137 | Lewis | Apr. 18, 1950 |

OTHER REFERENCES

N. A. C. A. Technical Note 2229, November 1950.